US006193211B1

(12) United States Patent
Watanabe et al.

(10) Patent No.: US 6,193,211 B1
(45) Date of Patent: Feb. 27, 2001

(54) MOTOR-OPERATED FLOW CONTROL VALVE AND GAS RECIRCULATION CONTROL VALVE FOR INTERNAL COMBUSTION ENGINE

(75) Inventors: Youichi Watanabe, Hitachinaka; Yasuyuki Nakano, Ibaraki-ken; Masayuki Suganami; Kzunori Irifune, both of Hitachinaka, all of (JP)

(73) Assignees: Hitachi, Ltd., Tokyo; Hitachi Car Engineering Co., Ltd., Hitachinaka, both of (JP)

(*) Notice: Subject to any disclaimer, the term of this patent is extended or adjusted under 35 U.S.C. 154(b) by 0 days.

(21) Appl. No.: 09/431,925

(22) Filed: Nov. 2, 1999

Related U.S. Application Data

(63) Continuation of application No. 08/897,307, filed on Jul. 21, 1997, now Pat. No. 6,089,536.

(30) Foreign Application Priority Data

Jul. 19, 1996 (JP) ........................ 8-190525

(51) Int. Cl.[7] .............. F16K 31/04; F02M 25/07; F01P 7/00

(52) U.S. Cl. .............. 251/129.11; 123/568.24; 123/41.01

(58) Field of Search .............. 123/568.24, 41.01, 123/339.25; 251/129.11

(56) References Cited

U.S. PATENT DOCUMENTS 4,378,767 4/1983 Kobashi et al. ................ 123/339.26
4,378,768 4/1983 Itoh et al. ................ 123/339.23
4,381,747 5/1983 Kobayashi et al. ................ 123/339.26
4,397,275 8/1983 Itoh et al. ................ 123/41.31
4,414,942 11/1983 Itoh et al. ................ 123/339.26
4,432,318 2/1984 Kobashi et al. ................ 123/339.23
4,938,614 * 7/1990 Imamura et al. ................ 384/537
5,184,593 2/1993 Kobayashi ................ 123/568.24
5,501,201 * 3/1996 Miyoshi et al. ................ 123/568.24
5,718,259 * 2/1998 Miyake et al. ................ 137/338
5,769,390 * 6/1998 Ando ................ 251/129.11

FOREIGN PATENT DOCUMENTS 7-190226 7/1995 (JP) .
7-190227 7/1995 (JP) .

* cited by examiner

*Primary Examiner*—Henry C. Yuen
*Assistant Examiner*—Arnold Castro
(74) *Attorney, Agent, or Firm*—Evenson, McKeown, Edwards & Lenahan, P.L.L.C.

(57) ABSTRACT

Disclosed is a motor-operated flow control valve for internal combustion engines which has a longer useful life and does not cause a drop of torque generated by a motor at the start-up. A rotor shaft (9) is reciprocated with rotating motion of a motor (32), whereupon a valve head (2*a*) is moved to open and close an orifice for control of a flow rate. Specific frequency of a rotor unit (33) of the motor (32) is set to be higher than the secondary vibration frequency of rotation of a 4-cycle internal combustion engine. The rotor unit (33) comprises an integral magnet (25), a single ball bearing (27) and a resin-made magnet holder (26) for supporting these two members, the magnet, the ball bearing and the magnet holder being formed into an integral structure. The rotor unit is supported such that an outer race (27*c*) of the ball bearing (27) is held at its one end against an inner peripheral wall of a housing resin (14) and a preload is applied to the other end of the outer race (27*c*).

6 Claims, 4 Drawing Sheets

MOTOR-OPERATED FLOW CONTROL VALVE AND GAS RECIRCULATION CONTROL VALVE FOR INTERNAL COMBUSTION ENGINE

This application is a continuation of application Ser. No. 08/897,307, filed Jul. 21, 1997, issued as U.S. Pat. No. 6,089,536, Jul. 18, 2000.

BACKGROUND OF THE INVENTION

1. Field of the Invention

The present invention relates to a motor-operated flow control valve suitable for use in internal combustion engines, and more particularly to an exhaust gas recirculation control valve for internal combustion engines.

2. Description of the Related Art

Conventional motor-operated flow control valves have such a known structure that a rotor unit of a motor for driving a valve is rotatably supported by a pair of ball bearings disposed in upper and lower portions of the rotor unit.

Those conventional motor-operated flow control valves are disclosed in, for example, U.S. Pat. Nos. 4,432,318, 4,381,747, 4,378,767, 4,378,768, 4,414,942, 4,397,275 and 5,184,593, JP-A-7-190227 and 7-190226, etc.

SUMMARY OF THE INVENTION

In the conventional motor-operated flow control valves, because the rotor unit of the motor is rotatably supported by two ball bearings disposed in upper and lower portions of the rotor unit, there inevitably occurs relative wobbling between inner and outer races of each of the ball bearings. When used in internal combustion engines, therefore, such a motor-operated flow control valve tends to resonate with rotative vibration of the internal combustion engine, resulting in a problem that the useful life of the valve itself and a device including the valve is shortened.

To lessen the relative wobbling between the inner and outer races, there is also known a structure that the rotor unit is supported by two bearings under a state where a preload is applied to press the rotor unit in one direction. Specifically, for example, an outer race of one ball bearing is supported by a rigid body such as a housing, and an outer race of the other ball bearing is pressed by a spring such as a spring washer or a coil spring. With such a structure, however, because the preload generated by the spring washer or the like is applied to balls of the ball bearing as well, frictional torque occurred upon starting the rotor unit to rotate is increased. This results in another problem that the motor is required to produce a larger torque at the start-up.

An object of the present invention is to provide a motor-operated flow control valve for internal combustion engines which is less affected by vibration and has a longer useful life.

Another object of the present invention is to provide a motor-operated flow control valve for internal combustion engines which does not require a motor to produce a larger torque at the start-up.

To achieve the above objects, according to the present invention, in a motor-operated flow control valve comprising a rotor shaft reciprocating with rotating motion of a motor, and a valve head movable to open and close an orifice with the reciprocating motion of the rotor shaft, specific frequency of a rotor unit of the motor is set to be higher than the secondary vibration frequency of rotation of a 4-cycle internal combustion engine. With this feature, when applied to any of internal combustion engines having four, six and eight cylinders, the motor-operated flow control valve will not give rise to a resonance phenomenon and therefore has a longer useful life.

In the above motor-operated flow control valve, preferably, the rotor unit comprises an integral magnet, a single ball bearing and a resin-made magnet holder for supporting the magnet and the ball bearing, the magnet, the ball bearing and the magnet holder being formed into an integral structure. With this feature, the weight of the rotor unit can be so reduced as to make the specific frequency of the rotor unit have a value not resonating with engine vibration.

Further, to solve the above objects, according to the present invention, in a motor-operated flow control valve comprising a rotor shaft reciprocating with rotating motion of a motor, and a valve head movable to open and close an orifice with the reciprocating motion of the rotor shaft, a rotor unit of the motor comprises an integral magnet, a single ball bearing and a magnet holder for supporting the magnet and the ball bearing, the ball bearing having an outer race held fixed under a preload. With this feature, frictional torque occurred upon starting the rotor unit to rotate is reduced and torque required for the motor to produce at the start-up is made smaller.

DESCRIPTION OF THE PREFERRED EMBODIMENT

A motor-operated flow control valve for internal combustion engines according to an embodiment of the present invention will be described hereunder with reference to FIGS. 1 to 5.

Figure 1:
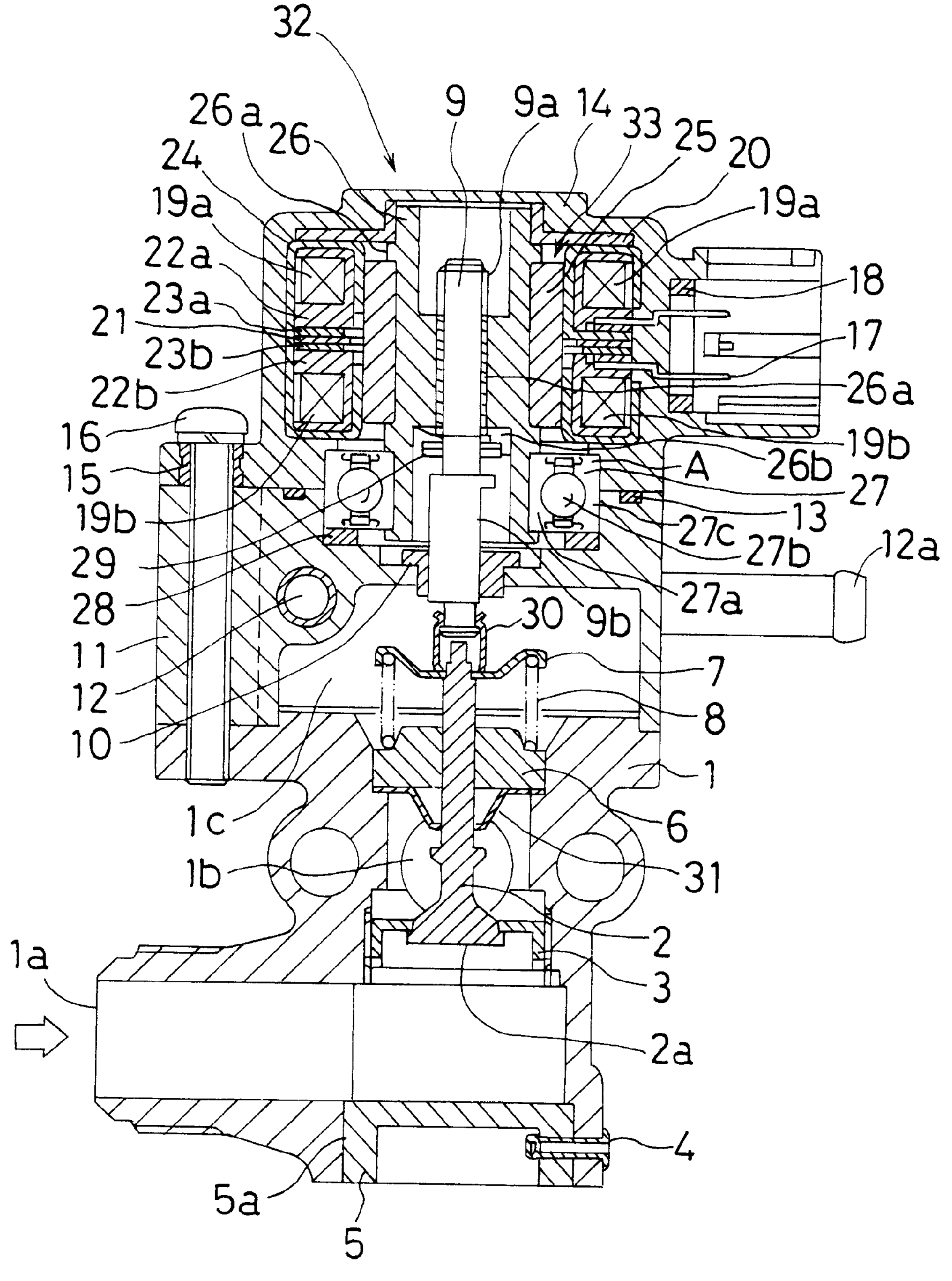
FIG. 1 is a vertical sectional view of a push-opened, motor-operated flow control valve for internal combustion engines according to one embodiment of the present invention.

FIG. 1 is a vertical sectional view of a push-opened, motor-operated flow control valve according to an embodiment of the present invention.

The motor-operated flow control valve according to this embodiment is employed as an EGR (Exhaust Gas Recirculation) valve for internal combustion engines. A valve body 1 defines an gas passage therein. Exhaust gas from an internal combustion engine flows into the valve body 1 through an inlet la and then flows out through an outlet 1*b* for return to the intake pipe side of the internal combustion engine.

An orifice member 3 is screwed into the gas passage between the inlet 1*a* and the outlet 1*b*. A valve shaft 2 having a valve head 2*a* provided at one end extends through a central opening (valve seat) formed in the orifice member 3 so that an orifice is opened and closed by the valve head 2*a*. A gas seal 6 is fixedly press-fitted in the valve body 1 and serves to seal off the exhaust gas flowing through the gas passage against leakage. The valve shaft 2 is slidably supported by the gas seal 6. A dust cover 31 is attached between the gas seal 6 and the valve body 1 to prevent foreign matters, such as carbon and oil contained in the exhaust gas, from adhering to a gap between an outer circumferential surface of the valve shaft 2 and the gas seal 6.

A plate 7 is connected by caulking to an upper end of the valve shaft 2 through a joint 30. A spring 8 is interposed between the plate 7 and the gas seal 6 to bias the plate 7 upward. The valve shaft 2 joined to the plate 7 is thereby urged upward, causing the valve head 2*a* to press against the valve seat of the orifice member 3. The valve head 2*a* is of push-opened type that it opens the orifice when pushed downward.

A body 11 and a motor 32 are both fixed to an upper portion of the valve body 1 by a set screw 16. A bushing 15 is inserted in a hole in which the set screw 16 for the motor 32 is inserted. The motor 32 is mounted in coaxial relation to the body 11. Between the motor 32 and the body 11, there is interposed an O-ring 13 to block off the intrusion of water, oil, etc. from the external.

Figure 5:
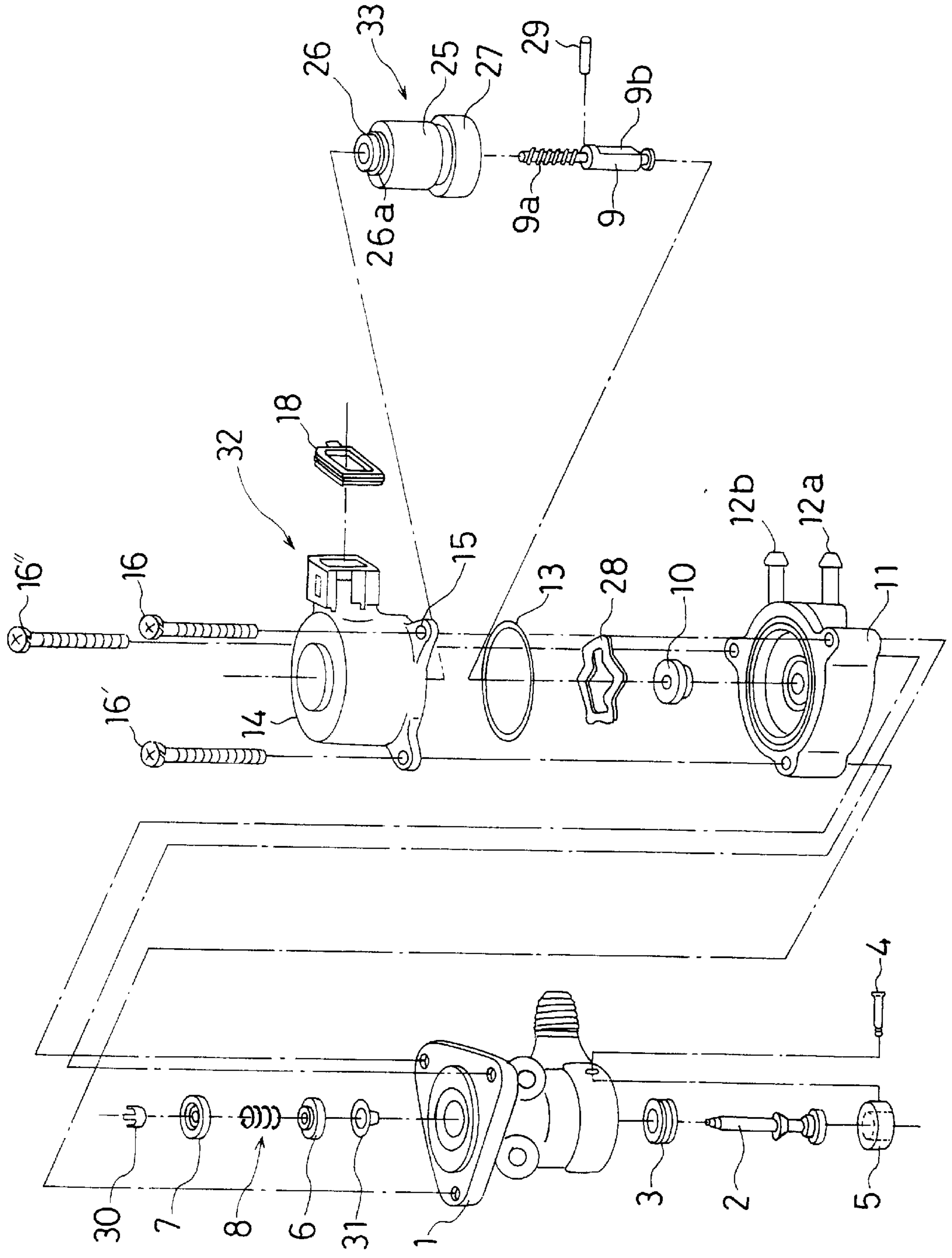
FIG. 5 is an exploded perspective view of parts of the motor-operated flow control valve according to one embodiment of the present invention.

The body 11 serves as an intermediate member for joining the motor 32 and the valve body 1 to each other. Since the exhaust gas at high temperature flows through the gas passage in the valve body 1, the body 11 has a cooling structure to prevent the heat of the exhaust gas from being transmitted to the motor 32. Specifically, a cooling pipe 12 is embedded inside the body 11 and cooling water is supplied from a cooling pipe inlet 12*a* to flow through the cooling pipe 12. A cooling pipe outlet 12*b* is located, as shown in FIG. 5, near the cooling pipe inlet 12*a* in side-by-side relation. The cooling water flows into the cooling pipe 12 through the inlet 12*a*, goes substantially round the interior of the body 11, and then flows out of the outlet 12*b*.

The cooling water contributes to more than cooling the motor 32 alone. The heat transmitted from the exhaust gas at high temperature may melt grease for a ball bearing 27 rotatably supporting a rotor unit 33 of the motor 32. If the viscosity of grease is lowered, the rotor rotation would be so fast as to cause an overshoot in opening and closing operation of the valve head 2*a*.

In this embodiment, the cooling water also cools the ball bearing 27 so that the viscosity of grease can be kept at a necessary level. Further, a wave washer 28 is interposed between the ball bearing 27 and a portion of the body 11 supporting it to prevent the heat from the exhaust gas from being directly transmitted to the ball bearing 27. On the other hand, the cooling effected by the cooling water promotes heat dissipation from the circumference of an outer race of the ball bearing 27.

An outer race 27*c* of the ball bearing 27 is held by being fitted astride between an inner peripheral wall of a socket portion of the body 11 and an inner peripheral wall of a socket portion of a housing resin 14 constituting a stator unit of the motor 32. With this structure, the motor 32 and the body 11 are positioned to have their axes coaxial with the axis of the ball bearing 27 as if those two members are one integral member.

A hole 5*a* is bored in the valve body 1 to align with an extension of the axis of the motor 32, allowing the valve shaft 2 to be inserted into the gas passage in the valve body 1 for installation.

The construction of the motor 32 will be described below. The stator unit of the motor 32 comprises a coil 19*a* housed in a bobbin 22*a* and a coil 19*b* housed in a bobbin 22*b*. Magnetic fields are generated by supplying electric currents to the coils 19*a,* 19*b*.

A yoke for forming a magnetic path has a C-shape in vertical section, and is made up of a yoke 24 nearly in the form of a hollow annulus cylinder and two disk-shaped yokes 23*a,* 23*b*. The bobbin 22*a* including the coil 19*a* is disposed in a space defined by the yoke 24 and the yoke 23*a,* while the bobbin 22*b* including the coil 19*b* is disposed in a space defined by the yoke 24 and the yoke 23*b*. Between both the yokes 23*a* and 23*b,* a center plate 21 is disposed to not only position the upper and lower yokes 23*a,* 23*b,* but also prevent magnetic interference possibly caused between the upper and lower coils 19*a,* 19*b*.

Disposed above the yoke 24 is a metallic upper plate 25 which functions as a flat bearing for an upper portion of a magnet holder 26. Terminals 17 are electrically connected to the coils 19*a,* 19*b* for supplying electric currents to the coils 19*a,* 19*b*. A sealing rubber 18 is attached around the terminals 17 to establish a watertight condition when connectors are fitted into the terminals 17 for supply of electric currents. The stator unit thus constructed is covered and fixed by the housing resin 14.

The rotor unit 33 of the motor 32 comprises a magnet 25, the ball bearing 27, and a resin-made magnet holder 26 supporting the former two members, which are integrally formed by insert molding. PPS (polyphenylene sulfide resin) is used as a resin material of the magnet holder 26. Teflon is added to PPS to provide the resin material with higher slidability. Note that, in addition to PPS, PBT (polybutylene terephtalate resin), PA (polyamide resin), etc. are also usable as the resin material. The magnet holder 26 has female threads 26*a* formed in its inner circumferential surface. A stopper 26*b* is integrally formed on the magnet holder 26 in a position inside the magnet holder 26 and below the female threads 26*a,* thereby restricting the rotation of a rotor shaft 7 when the rotor shaft 7 reaches a maximum pull-up position.

Here, since the components of the rotor unit 33, i.e., the magnet 25, the ball bearing 27 and the magnet holder 26, are integrally formed by simultaneous molding, it is possible to omit steps of bonding the magnet and press-fitting the ball bearing, which have been essential in the prior art, and hence to reduce the number of steps necessary for assembly. The simultaneous molding can also improve coaxiality among the magnet 25, the ball bearing 27 and the magnet holder 26, and therefore can reduce a variation in torque generated by the motor.

The rotor unit 33 of the motor 32 is rotatably held within the stator unit of the motor 32. Specifically, an upper end of the rotor unit 33 is rotatably supported by the upper plate 20 as part of the stator unit. In other words, an upper end portion of the magnet holder 26 is rotatably supported at its outer circumferential surface by an inner circumferential surface of the upper plate 20. Also, a lower end of the rotor unit 33 is rotatably supported by the ball bearing 27. The ball bearing 27 as one component of the rotor unit 33 comprises an inner race 27*a* integrally fixed to the magnet holder 26, balls 27*b,* and an outer race 27*c*. An upper end of the outer race 27*c* is held against the inner peripheral wall of the housing resin 14 of the motor 32, as indicated by arrow A in FIG. 1. Further, a lower end of the outer race 27*c* is biased toward the side of the motor 32 under a preload applied by a wave washer 28. The wave washer 28 is interposed between the outer race 27*c* of the ball bearing 27 and the body 11.

The rotor shaft 9 converts rotating motion of the motor 32 into reciprocating motion so that the valve shaft 2 reciprocates. The rotor shaft 9 has male threads 9*a* formed in complementary relation to the female threads 26*a* formed in the magnet holder 26. The rotor shaft 9 extends through the magnet holder 26 with the male threads 9*a* engaging the female threads 26*a*. A stopper pin 29 is press-fitted over the rotor shaft 9 and brought into abutment against the stopper 26*b* after the valve shaft 2 has seated onto the valve seat of the orifice member 3, thereby preventing the rotor shaft 9 from reciprocating over a greater stoke than determined by the abutment between the pin 29 and the stopper 26*b*. A shaft bushing 10 is fixed to the body 11 and serves to restrict the rotation of the rotor shaft 9. A lower portion 9*b* of the rotor shaft 9 has a D-shape in cross section and is fitted to a D-shaped opening formed in the shaft bushing 10. The joint 30 connected by caulking to the upper end of the valve shaft 2 is snap-fitted to the rotor shaft 9 for interconnection between the valve shaft 2 and the rotor shaft 9.

The orifice member 3 is screwed into the gas passage of the valve body 1 so that a flow rate can be adjusted by removing a plug 5 and then turning the orifice member 3 to move up or down. After the adjustment of a flow rate, the plug 5 is fitted in place to enclose the gas passage and is fastened with a rivet 4 so as not to drop off.

Assembling work of such a valve assembly will now be described in more detail.

Figure 4A:
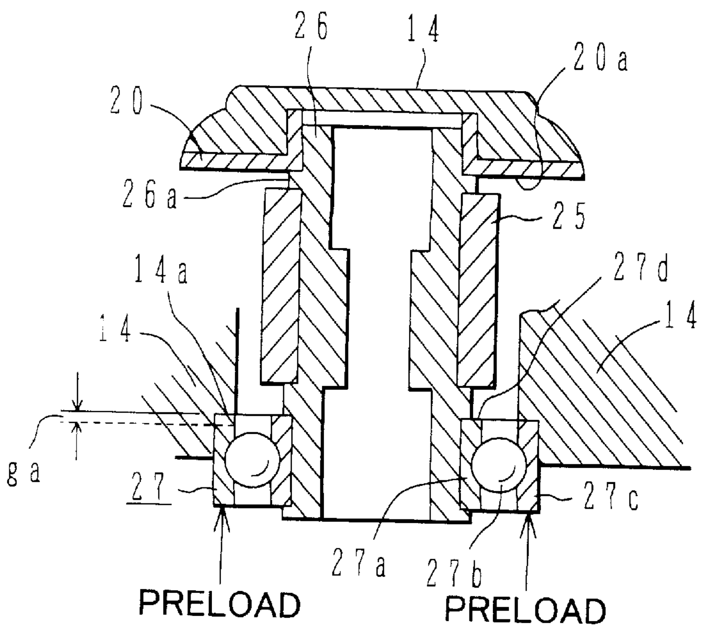
FIG. 4A is a view for explaining a preload applied to a ball bearing of the rotor unit of the motor in the motor-operated flow control valve according to one embodiment of the present invention.

The upper end of the magnet holder 26 is fitted to the upper plate 20, serving as a flat bearing, provided in the motor 32 such that the former's outer circumferential surface is slidably supported by the latter's inner circumferential surface. Simultaneously, a ring 26*a* projecting around the magnet holder 26 is brought into slidable pressure contact with an end face 20*a* of the flat bearing 20 in the thrust direction. This pressure contact force is given by a preload applied to the outer race 27*c* of the ball bearing 27 to bias it axially, as shown in FIG. 4A.

In a state of no preload being applied, there is a small gap $g_a$ between one or upper axial end 27*d* of the outer race 27*c* of the ball bearing 27 and an axial end face 14*a* of the socket portion of the housing resin 14 of the motor 32. This gap $g_a$ is set to be substantially equal to an amount of relative movement occurred between the inner and outer races of the ball bearing 27 in the thrust direction.

Accordingly, by applying the preload to the outer race 27*c* of the ball bearing 27 in a state where the ring 26*a* of the magnet holder 26 is held in pressure contact with the end face 20*a* of the flat bearing 20, the gap $g_a$ is eliminated and at the same time the relative movement between the inner and outer races of the ball bearing 27 in the thrust direction is prevented.

The preload is set to an appropriate value because the preload would develop resistance against the rotation of the balls 27*b* if its value is greater than necessary.

In this embodiment, the wave washer 28 interposed between an end of the socket portion of the body 11 in the thrust direction and an opposite or lower end of the outer race 27*c* of the ball bearing 27 in the thrust direction serves to not only produce but also adjust the preload.

The outer race 27*c* of the ball bearing 27 is loose-fitted at its outer circumference astride between the inner peripheral wall of the socket portion of the housing resin 14 of the motor 32 and the inner peripheral wall of the socket portion of the body 11. Therefore, the outer race 27*c* of the ball bearing 27 is movable through a distance corresponding to the gap $g_a$ in the thrust direction without undergoing resistance by the tightening force produced when the screw 16 is fastened to the body 11.

Whether the gap $g_a$ is to be left somewhat or become zero after the screw 16 has been fastened, is set case by case depending on how much preload should be applied to bias the magnet holder 26 in the axial direction.

The shaft bushing 10 is fixed to the body 11 at the center thereof. The lower end of the rotor shaft 9 of the rotor unit 33 assembled to the motor 32 is inserted through the shaft bushing 10, while the socket portion of the body 11 including the wave washer 28 set in place is fitted to surround the outer race 27*c* of the ball bearing 27. The motor 32 and the body 11 are thereby assembled together.

On the other hand, the gas seal 6 is press-fitted to one side of a valve attachment hole formed in the valve body 1. At this time, the dust cover 31 is held between the gas seal 6 and a corresponding socket portion of the valve body 1. The dust cover 31 prevents dust contained in exhaust gas from depositing in a gap between a center hole of the dust seal 6 and the valve shaft 2 inserted through the center hole.

The orifice member 3 having a valve seat (opening) formed at the center is fitted into the valve attachment hole formed in the valve body 1 from the other side 5*a*.

The orifice member 3 is a tubular member and has male threads formed on its outer circumferential surface and meshing female threads formed in the valve attachment hole formed in the valve body 1.

The valve shaft 2 extends upward through the center opening of the orifice member 3, the center hole of the dust cover 31, and the center hole of the gas seal 6. The spring 8 is mounted on the upper end side of the valve shaft 2 between the gas seal 6 and the plate 7 with one end of the spring 8 held against the gas seal 6. The plate 7 is fixedly connected by caulking to the upper end of the valve shaft 2, and supports the joint 30 and the other end of the spring 8. On this occasion, the spring 8 is maintained in a compressed state under a preset load.

Therefore, the restoring force of the spring 8 pushes up the valve shaft 2 in the axial direction, causing the valve head 2*a* to be pressed against the valve seat of the orifice member 3. A resulting valve assembly is then fastened by the screws 16 to a motor assembly assembled as described above.

At this time, the joint 30 is connected or locked to the end of the lower portion 9*b* of the rotor shaft 9 by any suitable method. In this embodiment, the end of the joint 30 is first resiliently spread outward, while splitting to pieces, by the end of the rotor shaft lower portion 9*b* and then restored to an original converged state after riding over a step formed around the end of the rotor shaft lower portion 9*b*, thereby establishing a lock between the joint 30 and the rotor shaft 9.

After the valve body 1 and the motor 32 have been assembled with the intermediate body 11 held between them, work of adjusting a flow rate is carried out in a predetermined manner, and thereafter the orifice member 3 is fixed in the valve body 1 by welding or like.

More specifically, prior to the adjusting work, a sealer is applied to the meshed portion between the orifice member and the valve body. The inlet passage 1*a* and a chamber 1*c* defined between the valve body 1 and the body 11 are maintained under atmospheric pressure, while the outlet passage 1*b* is kept at constant pressure (e.g., −350 mmHg at 20° C.).

After power-on, the motor is excited in two phases to rotate through predetermined steps in the valve-closing direction. A resulting position is defined as an end point of initialization. This position represents a position reached when the motor has been rotated through several steps further from the mechanical stop position of the valve in the valve-closing direction.

Next, the orifice member 3 is rotated a predetermined angle for adjustment so that a first predetermined flow rate is achieved at a position reached when the motor has been rotated through first predetermined steps (e.g., 25 steps) from the end position of initialization in the valve-opening direction.

In this embodiment, since one thread pitch of the orifice member 3 has a stroke of 1.5 mm and one step of the motor has a stroke of 0.078 mm, turning the orifice member 3 about 18° provides an adjustment in an amount corresponding to one step of the motor.

After the first predetermined flow rate has been achieved, the motor is rotated in the valve-closing direction until the fully-closed position of the valve. The power is once turned off in the fully-closed position of the valve. Subsequently, the above-stated initializing operation is executed again and the motor is rotated step by step in the valve-opening direction for confirming that the gas starts to flow at the fully-closed position of the valve.

Thereafter, it is confirmed whether predetermined flow rates are achieved at a plurality of points where the motor is rotated through respective predetermined steps from the end point of initialization in the valve-opening direction. If not achieved, then the adjusting work is repeated by turning the orifice member.

When the adjusting work is completed and the orifice member 3 is fixed in the valve body 1, the plug 5 is press-fitted into the valve attachment hole on the lower side 5*a* for enclosing the hole, and is fastened with the rivet 4 by caulking.

The operation of this embodiment will be described below. In the motor 32 as a stepping motor, pulse signals supplied from the terminals 17 are applied to the coils 19, whereupon the rotor unit 33 of the motor 32 is rotated stepwisely. Rotating motion of the rotor unit 33 is converted into reciprocating motion through meshing between the female threads 26*a* of the magnet holder 26 and the male threads 9*a* of the rotor shaft 9, thus causing the rotor shaft 9 to reciprocate. The reciprocating motion of the rotor shaft 9 is transmitted to the valve shaft 2 for reciprocating it. Since a gap between the valve head 2*a* of the valve shaft 2 and the valve seat of the orifice member 3 is changed with the reciprocating motion of the valve shaft 2, a flow rate of exhaust gas flowing from the inlet la to the outlet 1*b* can be changed.

The relationship between the resonance frequency of the rotor unit of the motor in the motor-operated flow control valve constructed as described above and the secondary vibration frequency of rotation of a 4-cycle internal combustion engine will now be described. In this embodiment, the resonance frequency of the rotor unit of the motor is set to be not lower than the secondary vibration frequency of rotation of a 4-cycle internal combustion engine.

The secondary vibration frequency of rotation of a 4-cycle internal combustion engine depends on the number of cylinders and the maximum rotational speed of the internal combustion engine. Assuming, for example, that a 4-cycle internal combustion engine with six cylinders has a maximum rotational speed of 6000 rpm, the secondary vibration frequency of rotation of the internal combustion engine is 300 Hz. This frequency can be determined as follows. In a 4-cycle internal combustion engine, there occurs one explosion for every two rotations per cylinder. Accordingly, the engine having six cylinders causes six explosions for every two rotations, i.e., three explosions for each rotation. On the other hand, the maximum rotational speed of 6000 rpm is equivalent to 100 rps. Because of 100 rps×3=300 (Hz), the secondary vibration frequency of rotation of such an internal combustion engine is provided by 300 Hz.

Likewise, assuming that a 4-cycle internal combustion engine with eight cylinders has a maximum rotational speed of 6000 rpm, the secondary vibration frequency of rotation of the internal combustion engine is 400 Hz. Further, assuming as another higher-speed engine that a 4-cycle internal combustion engine with eight cylinders has a maximum rotational speed of 8000 rpm, the secondary vibration frequency of rotation of the internal combustion engine is calculated as 533 Hz from the following formula:

$$f=(n/60)\times m$$

where

- m: degree (the number of explosions per rotation of crankshaft)
- m=2, 3, 4 for engines with four, six and eight cylinders, respectively
- f: frequency
- n: engine rotational speed On the other hand, in this embodiment, the rotor unit 33 of the motor 32 is formed by integrally insert-molding the magnet 25, the ball bearing 27, and the resin-made magnet holder 26 supporting the former two members. Thus, the magnet 25 is supported by the resin-made magnet holder 26. Also, since only one ball bearing 27 is employed in the rotor unit 33, no ball bearing is provided in the upper portion of the rotor unit 33 and the weight of the rotor unit 33 is reduced correspondingly. With such a structure, the resonance frequency of the rotor unit can be increased over the secondary vibration frequency of rotation of a 4-cycle internal combustion engine, e.g., 533 Hz. As a result, the rotor unit of the motor will never resonate with the rotation of the internal combustion engine and the useful life of the motor-operated flow control valve can be prolonged. Further, the motor-operated flow control valve can be mounted on most of internal combustion engines without changing the design of the rotor unit.

A method of measuring the resonance frequency of the rotor unit of the motor in the motor-operated flow control valve according to an embodiment of the present invention will be described below with reference to FIGS. 2 and 3.

Figure 2:
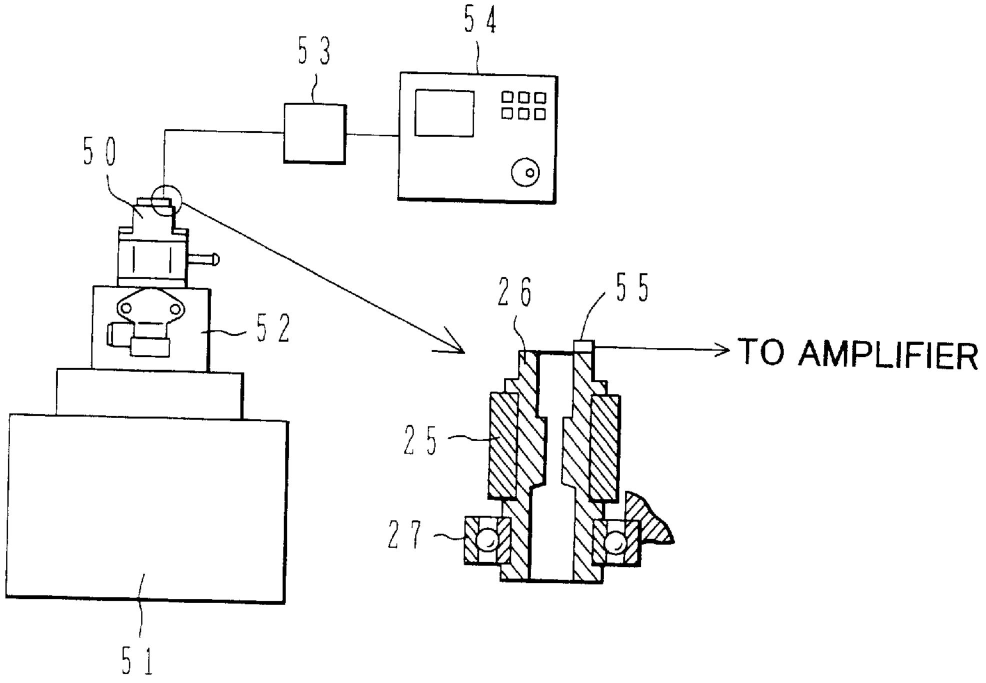
FIG. 2 is a schematic view showing a construction of a device for measuring the resonance frequency of a rotor unit of a motor in the motor-operated flow control valve according to one embodiment of the present invention.

FIG. 2 is a schematic view showing a construction of a device for measuring the resonance frequency of the rotor unit of the motor in the motor-operated flow control valve according to an embodiment of the present invention.

A motor-operated flow control valve 50 according to this embodiment and having the structure shown in FIG. 1 is fixedly placed on a base 52 of a vibrating machine 51. A G (gravity) sensor 55 is attached to the upper end of the magnet holder 26 of the rotor unit 33 in the motor-operated flow control valve 50. An output of the G sensor 55 is taken in by an FET analyzer 54 through an amplifier 53.

The resonance frequency of the rotor unit 33 can be measured by vibrating the motor-operated flow control valve 50 with the base G and analyzing a resulting output signal by the FET analyzer 54 with frequency plotted along the horizontal axis.

Figure 3:
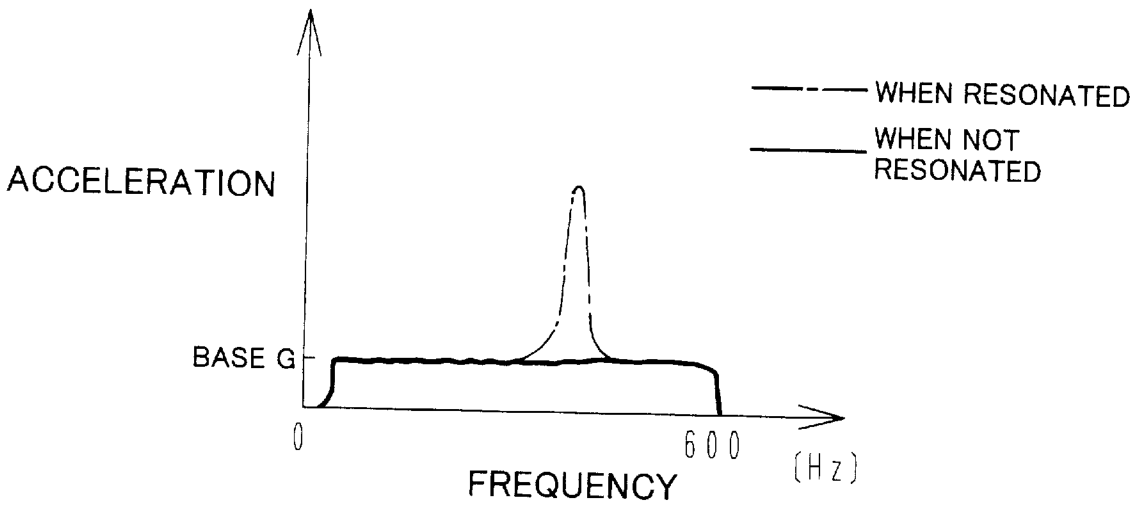
FIG. 3 is a graph showing a measured result of the resonance frequency of the rotor unit of the motor in the motor-operated flow control valve according to one embodiment of the present invention.

FIG. 3 is a graph showing a measured result of the resonance frequency of the rotor unit of the motor in the motor-operated flow control valve according to an embodiment of the present invention.

In the graph of FIG. 3, the horizontal axis represents frequency and the vertical axis represents acceleration. When the rotor unit is resonated with the engine vibration, the acceleration shows a peak value at certain frequency which is the resonance frequency of the rotor unit, as indicated by a one-dot-chain line in the graph. By contrast, as indicated by a solid line, the resonance frequency does not appear in a frequency range up to 600 Hz in the motor-operated flow control valve of this embodiment because the rotor unit of the motor is constructed to have resonance frequency higher than the secondary vibration frequency of rotation of a 4-cycle internal combustion engine.

Further, in this embodiment, the rotor unit 33 of the motor 32 comprises the magnet 25, the ball bearing 27, and the resin-made magnet holder 26 supporting the former two members, which are integrally formed by insert molding. Additionally, the rotor unit 33 includes only one ball bearing 27 and the outer race of the ball bearing is fixedly held at its upper and lower ends by a structure exerting no preload upon the balls of the ball bearings. This means that frictional torque occurred upon starting the rotor unit to rotate is reduced and hence a drop of the torque generated by the motor can be avoided at the start-up.

The above point will be described in detail with reference to FIG. 4.

FIG. 4 is a view for explaining a preload applied to a ball bearing of a rotor unit of a motor in motor-operated flow control valves.

FIG. 4A schematically shows the structure of applying a preload to the rotor unit of the motor in this embodiment. The rotor unit 33 of the motor 32 is formed by integrally insert-molding the magnet 25, the ball bearing 27, and the resin-made magnet holder 26 supporting the former two members. Here, only one ball bearing 27 is employed in the rotor unit 33. The upper end of the outer race 27*c* of the ball bearing 27 is held against the housing resin 14 of the motor 32, and the lower end of the outer race 27*c* is biased toward the side of the motor 32 under a preload applied by the wave washer 28. In other words, the outer race of the single ball bearing is held at the upper and lower ends thereof to be fixed in place with the structure exerting no preload on the balls of the ball bearing. Accordingly, frictional torque occurred upon starting the rotor unit to rotate can be reduced and hence a drop of the torque generated by the motor can be avoided at the start-up.

Figure 4B:
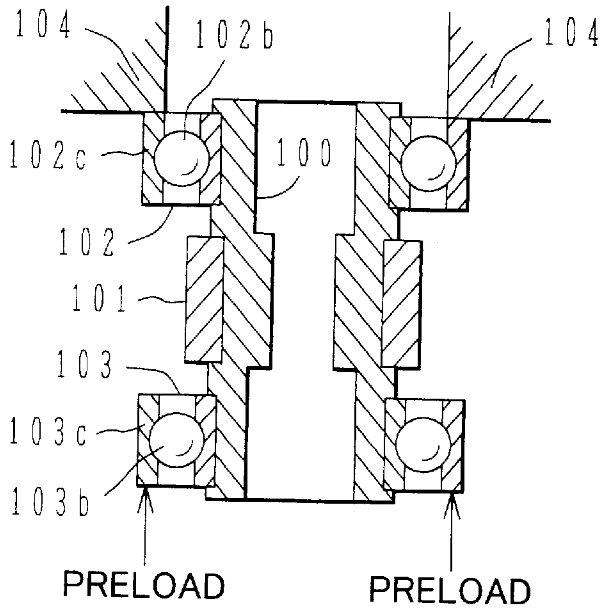
FIG.4B PRIOR ART
FIG. 4B is a similar view for explaining a preload applied to a ball bearing in the prior art.

FIG. 4B schematically shows a conventional structure of supporting a rotor unit by two ball bearings. In such a conventional structure, for example, a magnet 101 is fixed to a magnet holder 100 and two ball bearings 102, 103 are fixed one to each of both ends of the magnet holder 100. An outer race 102*c* of one upper ball bearing 102 is held at its upper end against a stationary portion 104. Then, a preload is applied by a spring or the like to an outer race 103*c* of the other lower ball bearing 103. In this structure, since the preload applied to the outer race 103*c* of the lower ball bearing 103 is transmitted to the stationary portion 104 through balls 103*b*, 102*b* of both the ball bearings 103, 102. Stated otherwise, pressure is exerted on the balls 103*b*, 102*b* in the conventional structure. As a result, frictional torque occurred upon starting the rotor unit to rotate is increased and hence the torque generated by the motor is reduced correspondingly at the start-up.

By contrast, with the structure of this embodiment, since the rotor unit 33 employs the single ball bearing 27 and the outer race of the single ball bearing is held at the upper and lower ends thereof to be fixed in place as described above with reference to FIG. 4A, the pressure exerted on the balls of the ball bearing is small. It is therefore possible to reduce frictional torque occurred upon starting the rotor unit to rotate and hence to avoid a drop of the torque generated by the motor at the start-up.

A method of assembling the motor-operated flow control valve according to this embodiment will now be described with reference to FIG. 5.

FIG. 5 is an exploded perspective view of parts of the motor-operated flow control valve according to an embodiment of the present invention.

Referring to FIG. 5, steps of assembling the motor-operated flow control valve according to this embodiment are as follows. After attaching the stopper pin 29 to the rotor shaft 9, the rotor shaft 9 with the stopper pin 29 is screwed into the rotor unit 33. Because the male threads 9*a* are formed on the upper portion of the rotor shaft 9 and the female threads are formed in the magnet holder 26, the rotor shaft 9 is screwed in and attached to the rotor unit 33 through meshing between the male threads 9*a* and the female threads. The rotor unit 33 is formed by molding the magnet 25 and the ball bearing 27 integrally with the magnet holder 26. The rotor unit 33 is placed in the housing resin 14 of the motor 32. The stator unit is previously mounted in the housing resin 14 with the bushings 15 and the sealing rubber 18 inserted in place.

The shaft bushing 10 is fitted to the center of the body 11. The O-ring 13 is inserted in a groove formed in an upper surface of the body 11, and the wave washer 28 is placed in a recess at the upper end side of the body 11. After that, the motor 32 is tentatively placed on the body 11. At this time, the D-shaped lower portion 9*b* of the rotor shaft 9 is inserted through the shaft bushing 10 in alignment with the D-shaped opening formed in the shaft bushing 10. Further, two sets of three holes defined in the housing resin 14 of the motor 32 and the body 11 for attachment of set screws 16, 16', 16" are aligned with each other.

Then, into a central opening of the valve body 1 on the upper end side is inserted the dust cover 31 and then press-fitted the gas seal 6. Also, the orifice member 3 is screwed into the valve body 1 from the lower end side. The valve shaft 2 is inserted from below through the center opening of the orifice member 3, the center hole of the dust cover 31, and the center hole of the gas seal 6. The spring 8 and the plate 7 are set in place from the upper end side of the valve shaft 2. The joint 30 is then connected by caulking to the upper end of the valve shaft 2 while the spring 8 is held in a compressed state.

The valve body 1 thus assembled is combined with the body 11 and the motor 32 which have been tentatively positioned in place as mentioned above. The end of the joint 30 is then snap-fitted over the end of the rotor shaft 9. After positioning the valve body 1 relative to the motor 32 and the body 11, these three members are joined together by using the set screws 16, 16', 16".

Finally, the orifice member 3 is turned from the lower side of the valve body 1 for adjustment of a flow rate, and the plug 5 is inserted into the valve body 1 and fastened with the rivet 4. The assembly of the motor-operated flow control valve is thus completed.

With this embodiment, as described above, since the specific frequency of the rotor unit is set to be higher than the secondary vibration frequency of rotation of a 4-cycle internal combustion engine, the useful life of the motor-operated flow control valve can be prolonged.

Also, since the specific frequency of the rotor unit is set to be higher than the secondary vibration frequency of rotation of a 4-cycle internal combustion engine, the useful life of the motor-operated flow control valve can be applied to most of internal combustion engines without changing the design of the rotor unit.

Further, since the magnet holder constituting the rotor unit is made of resin and the ball bearing for rotatably supporting the rotor unit is provided only one, the weight of the rotor unit can be reduced and the resonance frequency of the rotor unit can be raised.

Since the outer race of the single ball bearing is held fixed vertically under a preload, the inner race of the ball bearing is subject to no preload and frictional torque occurred upon starting the rotor unit to rotate can be reduced remarkably. Therefore, a drop of the torque generated by the motor due to the increased frictional torque of the rotor unit at the start-up can be made smaller.

Since the components of the rotor unit, i.e., the magnet, the ball bearing and the magnet holder, are integrally formed by simultaneous molding, it is possible to omit steps of bonding the magnet and press-fitting the ball bearing, which have been essential in the prior art, and hence to reduce the number of steps necessary for assembly.

Since the simultaneous molding of components of the rotor unit also contributes to improving coaxiality among the magnet, the ball bearing and the magnet holder, a variation in torque generated by the motor can be reduced.

Since the load imposed on the ball bearing can be reduced, it is possible to provide the ball bearing in the rotor unit only on one end side the rotor shaft and employ a flat bearing for supporting the other end side of the rotor shaft.

Since the outer race of the ball bearing is disposed to position astride a joint plane between the motor and the intermediate body, the axes of the motor and the intermediate body can be simply aligned with the axis of the ball bearing.

In addition, since a flow rate is adjusted by turning the orifice member, an amount of gas can be adjusted in units of one step of the motor by adjusting the orifice member through a small angle for each turn.

It is to be noted that while the above embodiment has been described as using the motor-operated flow control valve for EGR, the present invention is also applicable to, e.g., air flow control for ISC (Idle Speed Control) and control of any other fluids.

What is claimed is:

1. A motor-operated exhaust gas recirculation control comprising a rotor shaft reciprocating with rotating motion of a motor, and a valve head movable to open and close an orifice with the reciprocating motion of said rotor shaft, wherein said valve comprises a motor, a valve body for supporting said valve head, and a body joining said motor and said valve body together and having a cooling water passage formed therein, and the outer race of said ball bearing is held in place by said body, wherein an end face of an outer race of a ball bearing is held in place through a washer in the axial direction of said rotor shaft, wherein the washer is a wave washer arranged to form a heat insulating space between the outer race of the bearing and the body joining said motor and said valve body together.

2. A motor-operated exhaust gas recirculation control valve according to claim 1, wherein a cooling water passing through said cooling water passage is a cooling water for an internal combustion engine.

3. A motor-operated flow control valve comprising a rotor shaft reciprocating with rotating motion of a motor, and a valve head movable to open and close an orifice with the reciprocating motion of said rotor shaft, wherein a rotor unit of said motor comprises a magnet, a single ball bearing and a magnet holder for supporting said magnet and an inner race of said ball bearing, said ball bearing having an outer race held fixed under a preload, between a case of said motor and a body holding said motor, a small gap existing between an upper axial end of said motor case and said single ball bearing and a axial end face of a socket portion being equal to or smaller than an amount of relative movement between said inner and outer races of said single ball bearing in a thrust direction.

4. A motor-operated flow control valve according to claim 3, wherein said magnet holder is formed by insert molding, and said magnet and inner race of said single ball bearing are inserted in said magnet holder.

5. A motor-operated flow control valve according to claim 4, wherein an end face of said race of said single ball bearing is held in place through a washer in the axial direction of said rotor shaft.

6. A motor-operated flow control according to claim 3, wherein an end face of said race of said single ball bearing is held in place through a washer in the axial direction of said rotor shaft.

* * * * *